United States Patent
Kim et al.

(10) Patent No.: US 12,459,432 B2
(45) Date of Patent: Nov. 4, 2025

(54) METHOD OF CONTROLLING SOUND OF AUDIO DEVICE BASED ON GAZE DIRECTION OF VEHICLE OCCUPANT AND DEVICE THEREFOR

(71) Applicant: HYUNDAI MOBIS CO., LTD., Seoul (KR)

(72) Inventors: Tae Hun Kim, Suwon-si (KR); Seung Hwan Lee, Hwaseong-si (KR); Ji Soo Shin, Yongin-si (KR); Myung Bin Choi, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 38 days.

(21) Appl. No.: 18/624,668

(22) Filed: Apr. 2, 2024

(65) Prior Publication Data
US 2025/0018861 A1  Jan. 16, 2025

(30) Foreign Application Priority Data
Jul. 10, 2023  (KR) .......................... 10-2023-0089262

(51) Int. Cl.
*B60Q 9/00* (2006.01)
*G06F 3/16* (2006.01)

(52) U.S. Cl.
CPC ............ *B60Q 9/008* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 7,791,458 B2* | 9/2010 | Shimaoka | B60Q 1/085 348/148 |
| 10,325,499 B2* | 6/2019 | Tayama | H04R 1/40 |
| 10,926,780 B2* | 2/2021 | Giraud | B60W 50/16 |
| 11,260,792 B1* | 3/2022 | Lee | B60Q 5/008 |
| 2003/0156019 A1* | 8/2003 | Lehmann | G01S 13/931 340/691.2 |
| 2012/0314871 A1* | 12/2012 | Koga | H04S 7/304 381/17 |
| 2015/0161872 A1* | 6/2015 | Beaulieu | B66C 13/40 340/686.6 |
| 2017/0096104 A1* | 4/2017 | Kelly | B60Q 9/00 |
| 2017/0111740 A1* | 4/2017 | Hviid | H04R 5/033 |
| 2019/0052967 A1* | 2/2019 | Kim | H04R 1/403 |
| 2021/0323484 A1* | 10/2021 | Jeong | B60R 11/0235 |
| 2022/0108675 A1* | 4/2022 | Brockwell | G10H 1/46 |
| 2022/0118997 A1* | 4/2022 | Paus | B60W 50/14 |
| 2022/0203891 A1* | 6/2022 | Hong | B60Q 9/008 |
| 2023/0064724 A1* | 3/2023 | Morimura | G08G 1/166 |
| 2024/0054897 A1* | 2/2024 | Shoji | G08G 1/16 |

* cited by examiner

*Primary Examiner* — Muhammad Adnan
(74) *Attorney, Agent, or Firm* — Morgan Lewis & Bockius LLP

(57) ABSTRACT

Disclosed herein is a method of controlling, by a sound control device for audio devices, sounds of an audio device worn by an occupant according to some embodiments of the present disclosure. The method includes: obtaining information on the occupant and a hazard from sensors provided in a vehicle; and outputting a warning sound through the audio device worn by the occupant to indicate a hazardous situation. A direction in which the audio device outputs the warning sound may be adaptively determined based on the information on the occupant and the hazard.

16 Claims, 10 Drawing Sheets

METHOD OF CONTROLLING SOUND OF AUDIO DEVICE BASED ON GAZE DIRECTION OF VEHICLE OCCUPANT AND DEVICE THEREFOR

This application claims the benefit of Korean Patent Application No. 10-2023-0089262, filed on Jul. 10, 2023, which is hereby incorporated by reference as if fully set forth herein.

BACKGROUND

Technical Field

The present disclosure relates to a method of controlling the sound of an audio device for vehicle occupants, and more particularly to, a technology for controlling the sound of an audio device to alert collision risks with objects approaching a vehicle.

Discussion of the Related Art

As research and interest in autonomous vehicles continue to grow, the concept and focus on vehicles are shifting from mobility to utility. In other words, while vehicles are still used as a means to transport people to destinations, there is a growing trend towards focusing on the purpose of use. Such a vehicle is often referred to as a purpose-built vehicles (PBV).

A vehicle driven by the senses of a driver may be involved in accidents due to negligence of the driver or negligence of others. Vulnerable road users including the disabled or the elderly may encounter unexpected difficulties due to physical discomfort or inexperienced driving.

In particular, for visually impaired individuals, there is a greater risk of encountering danger if the visually impaired individuals do not properly see and respond to approaching objects, Moreover, if a vehicle occupant is wearing an audio device such as headphones while driving, the vehicle occupant may become too focused on music or radio broadcasts emitted from the audio device and fail to properly perceive the surroundings.

SUMMARY

Accordingly, the present disclosure is directed to a method of controlling the sound of an audio device based on the gaze direction of a vehicle occupant and device therefor that substantially obviate one or more problems due to limitations and disadvantages of the related art.

To address the issues described above, the present disclosure aims to provide a purpose-built vehicle (PBV) capable of offering various beneficial features to occupants.

Specifically, the present disclosure aims to provide a sound control method and device for audio devices to inform visually impaired individuals or other vulnerable road users who wear audio devices of a direction in which a collision is expected when a hazard is approaching.

The present disclosure is not limited to the objects described above, and other objects that the present disclosure could achieve will be more clearly understood from the following detailed description.

To achieve these objects and other advantages and in accordance with the purpose of the disclosure, as embodied and broadly described herein, there is provided is a device configured to control sounds of an audio device worn by an occupant. The device may include: an information acquisition unit configured to obtain information on the occupant and a hazard from sensors provided in a vehicle; and a controller configured to control the audio device worn by the occupant to output a warning sound to indicate a hazardous situation. The controller may be configured to adaptively determine a direction in which the audio device outputs the warning sound, based on the information on the occupant and the hazard obtained by the information acquisition unit.

The information on the occupant and the hazard may include at least one of information on a location of the hazard, information on a gaze direction of the occupant, or information on a distance between the occupant and the hazard.

A sound volume level of the audio device may be determined based on the distance information.

Based on a presence of a gaze movement of the occupant, the information acquisition unit may further obtain angle information based on the information on the gaze direction of the occupant and the information on the location of the hazard from the sensors.

The information on the gaze direction of the occupant may be obtained by a region of interest (ROI) technique that extracts a direction in which an ROI of the occupant is directed from an image corresponding to a face of the occupant captured by a camera, and the ROI may include at least one portion of the face of the occupant.

Based on the information on the gaze direction of the occupant, it may be determined whether the audio device outputs an additional warning sound in a direction opposite to the direction in which the audio device outputs the warning sound.

The information acquisition unit may additionally obtain angle information based on the information on the gaze direction of the occupant and the information on the location of the hazard, and a sound volume level of the warning sound output in the opposite direction may be determined based on the angle information.

The sound volume level of the warning sound output in the opposite direction may be inversely proportional to the angle information.

In another aspect of the present disclosure, provided herein is a method of controlling, by a sound control device for audio devices, sounds of an audio device worn by an occupant. The method may include: obtaining information on the occupant and a hazard from sensors provided in a vehicle; and outputting a warning sound through the audio device worn by the occupant to indicate a hazardous situation. A direction in which the audio device outputs the warning sound may be adaptively determined based on the information on the occupant and the hazard.

The information on the occupant and the hazard may include at least one of information on a location of the hazard, information on a gaze direction of the occupant, or information on a distance between the occupant and the hazard.

A sound volume level of the audio device may be determined based on the distance information.

The method may further include, based on a presence of a gaze movement of the occupant, obtaining angle information based on the information on the gaze direction of the occupant and the information on the location of the hazard from the sensors.

The information on the gaze direction of the occupant may be obtained by an ROI technique that extracts a direction in which an ROI of the occupant is directed from an image corresponding to a face of the occupant captured by a camera, and the ROI may include at least one portion of the face of the occupant.

Based on the information on the gaze direction of the occupant, it may be determined whether the audio device outputs an additional warning sound in a direction opposite to the direction in which the audio device outputs the warning sound, and a sound volume level of the warning sound output in the opposite direction may be determined based on the angle information.

The sound volume level of the warning sound output in the opposite direction may be inversely proportional to the angle information.

According to some embodiments of the present disclosure, a purpose-built vehicle (PBV) capable of providing various useful configurations to occupants may be implemented.

Specifically, when hazards such as bicycles, motorcycles, or other vehicles approach a vehicle occupied by a vehicle occupant wearing an audio device, a warning sound may be emitted through the left or right side of the audio device, and the volume level of the warning sound may be controlled to clearly indicate the direction of danger. This may also reduce the risk of accidents involving the vehicle.

The effects of the present disclosure are not limited to what has been described above, and other effects may be inferred from embodiments of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, exemplary implementations of the present disclosure will be described with reference to attached drawings. The detailed explanation provided below, along with the attached drawings, is intended to describe the exemplary implementations of the present disclosure and is not meant to represent the only embodiments capable of being implemented according to the present disclosure. The following detailed explanation includes specific details to provide a comprehensive understanding of the present disclosure. However, it is evident to those skilled in the art that the present disclosure is capable of being implemented without the specific details.

In various examples of the present disclosure, "/" and "," should be interpreted as representing "and/or." For example, "A/B" may mean "A and/or B." In addition, "A, B" may mean "A and/or B." Additionally, "A/B/C" may mean "at least one of A, B, and/or C," and "A, B, C" may mean "at least one of A, B, and/or C."

Hereinafter, embodiments of the present disclosure will be described in detail one by one.

Figure 1:
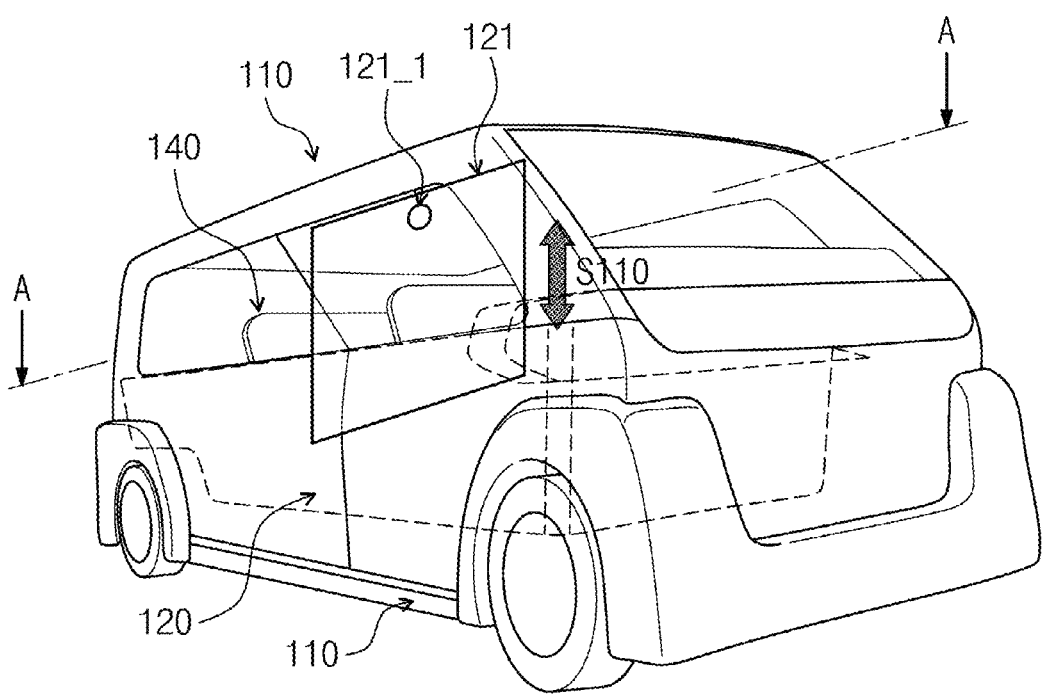
FIG. 1 is a diagram illustrating a purpose-built vehicle (PBV) according to some embodiments of the present disclosure.

FIG. 1 is a diagram illustrating a purpose-built vehicle (PBV) according to an embodiment of the present disclosure.

In one aspect of the present disclosure, a PBV for providing various convenience structures to occupants is provided.

FIG. 1 is a diagram illustrating a PBV according to an embodiment of the present disclosure.

Referring to FIG. 1, a PBV 110 may include a skateboard 120, a cabin 130, and a seat 140 located within the cabin 130.

The skateboard 120 forms the floor surface of the vehicle.

The cabin 130 may be coupled to the top of the skateboard 120, providing both an occupant space and a separate storage space.

For instance, due to the low floor of the cabin 130, the seat 140 needs to be adjusted to a higher position where the visibility line of a driver is secured. This allows for an additional storage space to be created underneath the seat 140 located in the occupant space of the cabin 130.

Figure 2:
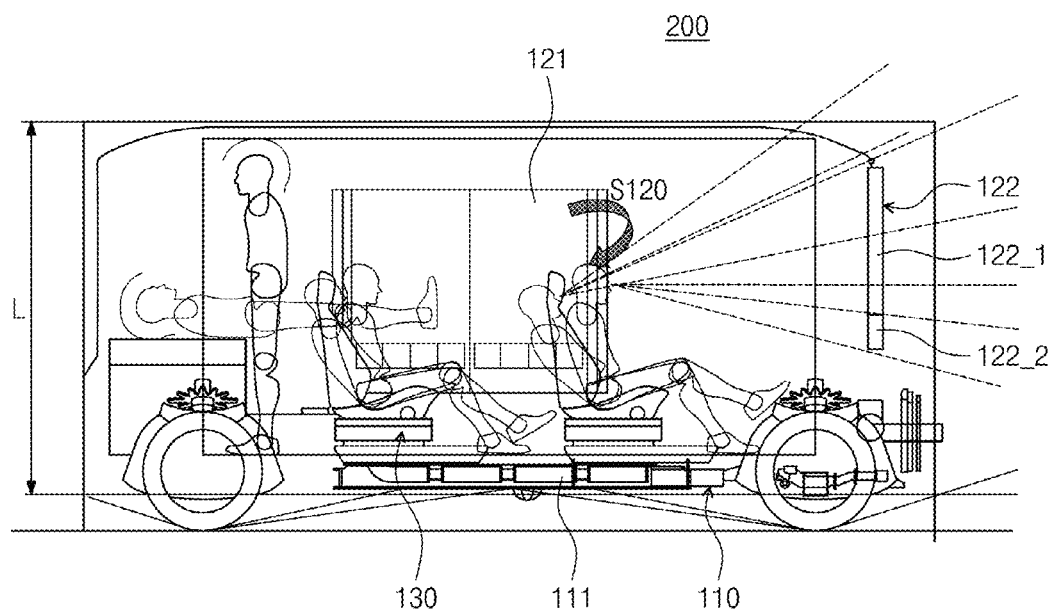
FIG. 2 is a side cross-sectional view showing the cross section A-A shown in FIG. 1.

FIG. 2 is a side cross-sectional view showing the cross section A-A shown in FIG. 1.

Referring to FIG. 2, a battery storage space 111 may be provided on the skateboard 120. It is desirable for the battery storage space 111 to be designed in consideration for battery installation (not shown) and control precision.

For the convenience of occupants, it is desirable that the cabin 130 is configured to adjust the recline of the seat 140 and rotate independently. In particular, the overall height (L) of the cabin 130 may be designed to a level where occupants are capable of standing comfortably.

In this case, the height (L) of the cabin 130 may also be adjustable according to separate control.

A side display 121 installed in the cabin 130 may output entertainment screens and other information images for infotainment purposes. The side display 121 may be positioned near a door where passengers board and provide necessary information to a passenger when the passenger enters the vehicle. This will be described in detail with reference to FIG. 4. The side display 121 may be configured to recognize the direction of the face of the passenger through image capture devices such as a camera 121_1. To this end, the side display 121 may be configured such that the side display 121 moves up and down (S110) depending on the height of the passenger as shown in FIG. 1. The vertical movement may be activated as the passenger approaches the vehicle and a terminal carried by the passenger is recognized by the vehicle.

The side display 121 according to an embodiment of the present disclosure may switch from an external display mode to an internal display mode after a passenger boards. FIG. 2 illustrates an example in which the side display 121 rotates (S120) to provide an internal display to passengers. A windshield 122 may have a display form that selectively displays images toward the interior and exterior of the vehicle.

The windshield 122 may include an electrochromic image area 122_1 and an opaque image area 122_2.

The electrochromic image area 122_1 may adjust shading such that images are selectively displayed towards the inside or outside of the vehicle depending on power supply.

The opaque image area 122_2 may extend upward or downward from the electrochromic image area 122_1.

As another example, the windshield 122 may be divided into an internal display area and an external display area.

For example, the internal display area may display images toward the interior of the vehicle, and the external display area may display images toward the exterior of the vehicle. In this case, the internal and external display areas may have different electrical supply paths.

Figure 3:
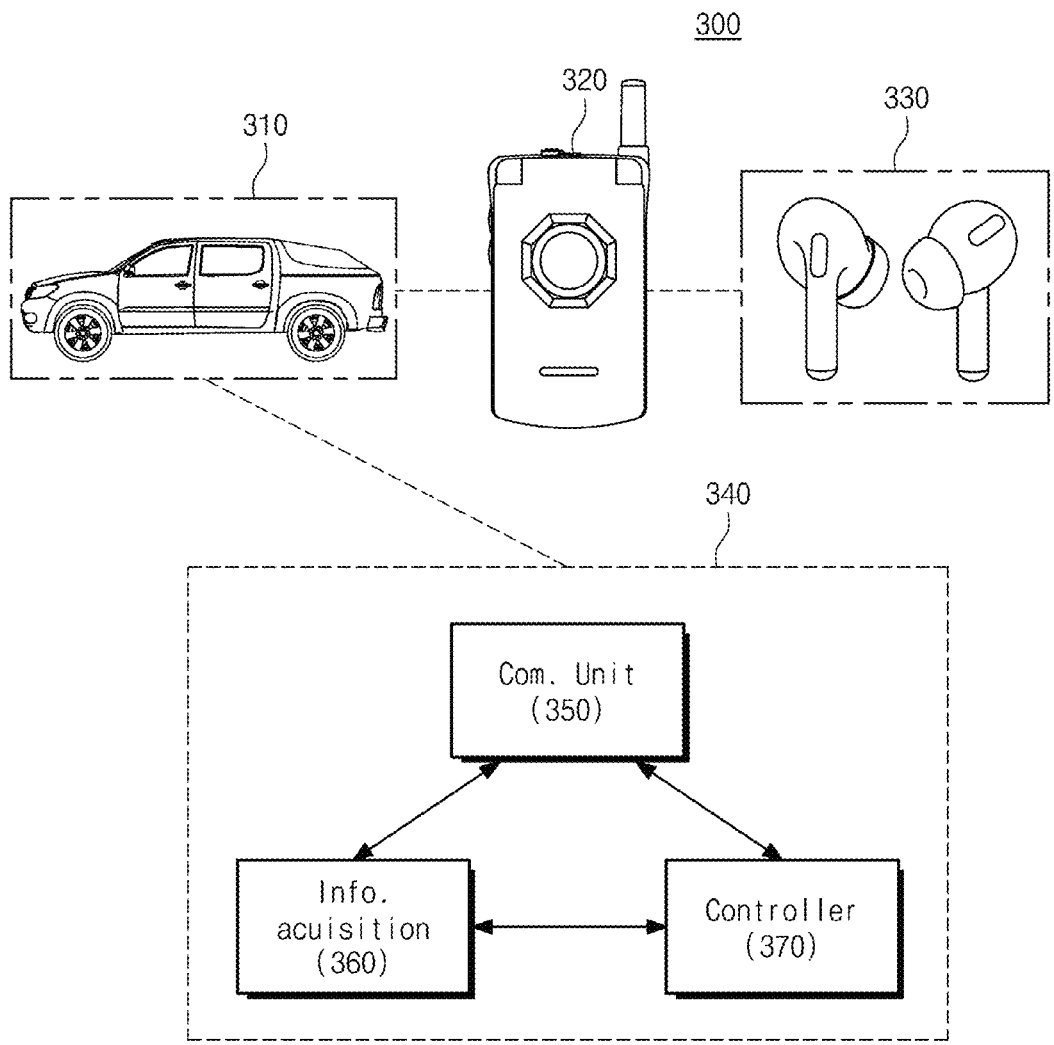
FIG. 3 is a diagram schematically illustrating the configuration of a sound control device for audio devices.

FIG. 3 is a block diagram illustrating a sound control device for audio devices according to some embodiments of the present disclosure.

A sound control device 340 for audio devices is installed in a vehicle 310. The sound control device 340 controls an audio device 330 to avoid collisions by warning a vehicle occupant wearing the audio device 330 of the risk of collision with surrounding objects approaching the vehicle 310 during driving.

The surrounding objects approaching the vehicle 310 may include vehicles, obstacles, pedestrians, bicycles, motorcycles, and the like. These surrounding objects may be considered as hazards or hazardous objects.

The sound control device 340 for audio devices may include a communication unit 350 for connecting the vehicle 310 with a terminal 320, an information acquisition unit 360 for collecting information around the vehicle 310, and a controller 370 for controlling the audio device 330 to provide warning sounds.

The vehicle 310 and the terminal 320 used by the occupant may be connected via a network. Additionally, the terminal 320 and the audio device 330 worn by the vehicle occupant may also be connected either wired or wirelessly. The wireless connection may be a connection via Bluetooth.

The communication unit 350 connecting the vehicle 310 and the terminal 320 used by the occupant may include a wired or wireless communication unit. The communication unit 350 may include one or more components enabling communication via various means such as a local area network (LAN), wide area network (WAN), value added network (VAN), mobile radio communication network, satellite communication network, and combinations thereof. Additionally, the communication unit 350 may transmit and receive data or signals wirelessly based on cellular communication, wireless LAN (e.g., Wireless Fidelity (Wi-Fi)) communication, and so on.

The terminal 320 used by the vehicle occupant may include a personal computer (PC), smartphone, personal digital assistant (PDA), tablet PC, and so on.

The information acquisition unit 360 may collect information detected by sensors installed in the vehicle 310. The sensors may include radio detection and ranging (radar), light detection and ranging (LiDAR), and/or cameras. The information acquisition unit 360 may acquire the following information through the sensors installed in the vehicle 310: information on the recognition of hazards around the vehicle, information on the location of hazards, information on the location of the vehicle occupant, information on the face image of the vehicle occupant, information on the angle between the vehicle occupant and hazards, and information on the angle between the gaze direction of the vehicle occupant and hazards.

The information acquisition unit 360 may include a memory. The memory may store programs for the operations of the controller 370 and temporarily or permanently store input/output data. The memory may include at least one type of storage medium such as a random access memory (RAM), static random access memory (SRAM), read-only memory (ROM), electrically erasable programmable read-only memory (EEPROM), programmable read-only memory (PROM), magnetic memory, magnetic disk, optical disk, hard disk, micro multimedia card, flash memory, or card-type memory (e.g., secure digital (SD) memory, extreme digital (XD) memory, etc.).

In addition, the memory may store various functions and algorithms, as well as a variety of data, applications, software, commands, and codes necessary for operating and controlling devices.

The controller 370 may control the overall operations of the sound control device 340 for audio devices. The controller 370 may execute one or more programs stored in the memory. The controller 370 may refer to a central processing unit (CPU), a graphics processing unit (GPU), or a dedicated processor for performing methods according to some embodiments of the present disclosure.

In some embodiments, at least one controller 370 may control a direction in which a warning sound is emitted from the audio device 330 and the volume level of the warning sound based on information collected from the vehicle sensors to warn the vehicle occupant of hazardous situations.

Figure 4:
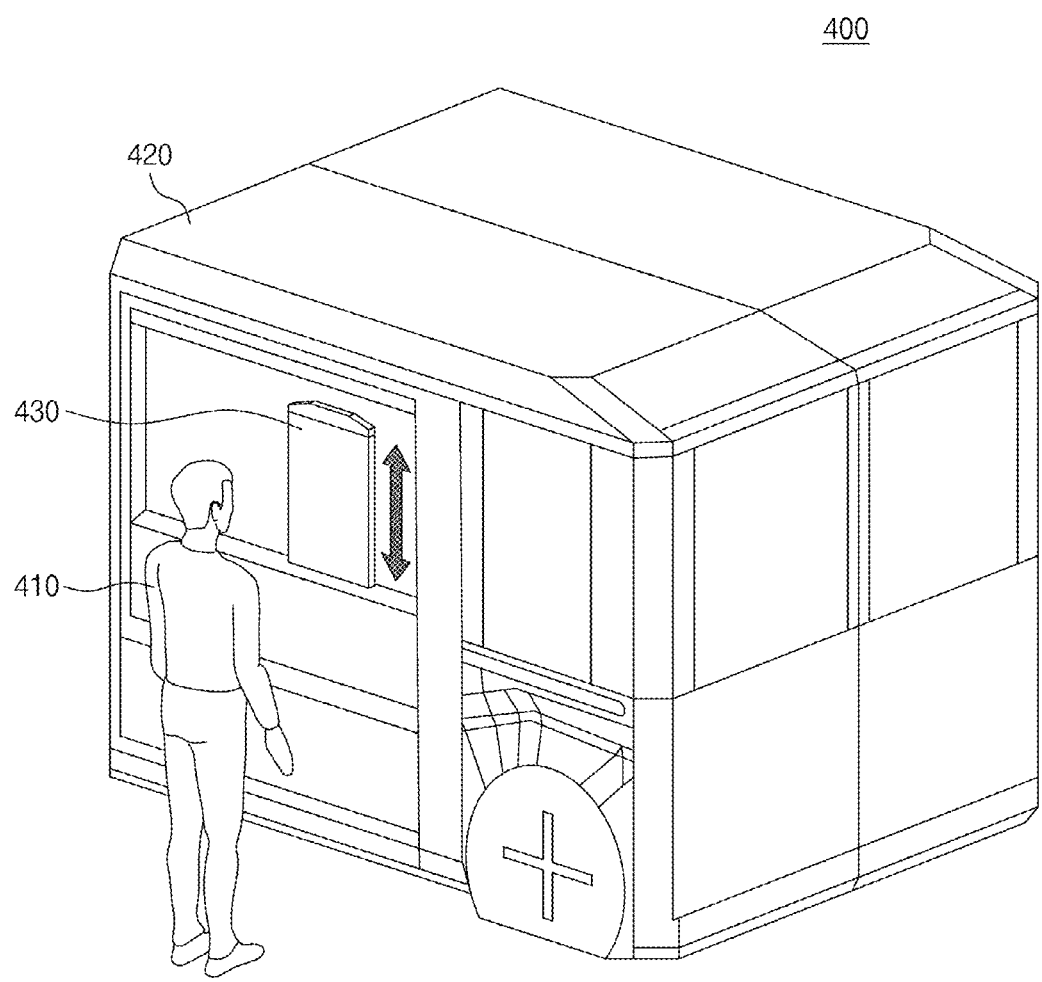
FIG. 4 is a diagram illustrating a method of operating a display device installed in a vehicle with a vehicle occupant according to some embodiments of the present disclosure.

FIG. 4 is a diagram illustrating a method of operating a display device installed in a vehicle with a vehicle occupant according to some embodiments of the present disclosure.

Specifically, FIG. 4 shows an example in which a vehicle occupant 410 wearing an audio device boards a vehicle 420 equipped with a display device 430 for providing visual information together with voice guidance including warning sounds.

The vehicle occupant 410 may be a person seated in the driver seat, a person seated in the passenger seat, or a person in the rear seat. The vehicle occupant 410 is not limited to the driver.

If a hazard such as an obstacle approaches from the left or right side of the vehicle 420 while the vehicle 420 is moving, a warning sound may be emitted from one side of the audio device worn by the occupant. Warning messages alerting to the danger may not only be provided through the audio device but also visually displayed on the display device 430.

Messages provided through the display device 430 may include various types of messages depending on the purpose of vehicle usage, such as warning sounds alerting to danger, operational messages related to driving, route guidance messages to the destination, and messages regarding the surroundings of the vehicle.

The position of the display device 430 may be adjusted such that the display device 430 is within the field of view of the vehicle occupant 410. For example, the position of the display device 430 may be adjusted up or down based on information such as the posture, sitting height, or standing height of the vehicle occupant 410 such that the display screen is within the field of view of the vehicle occupant 410.

Figure 5:
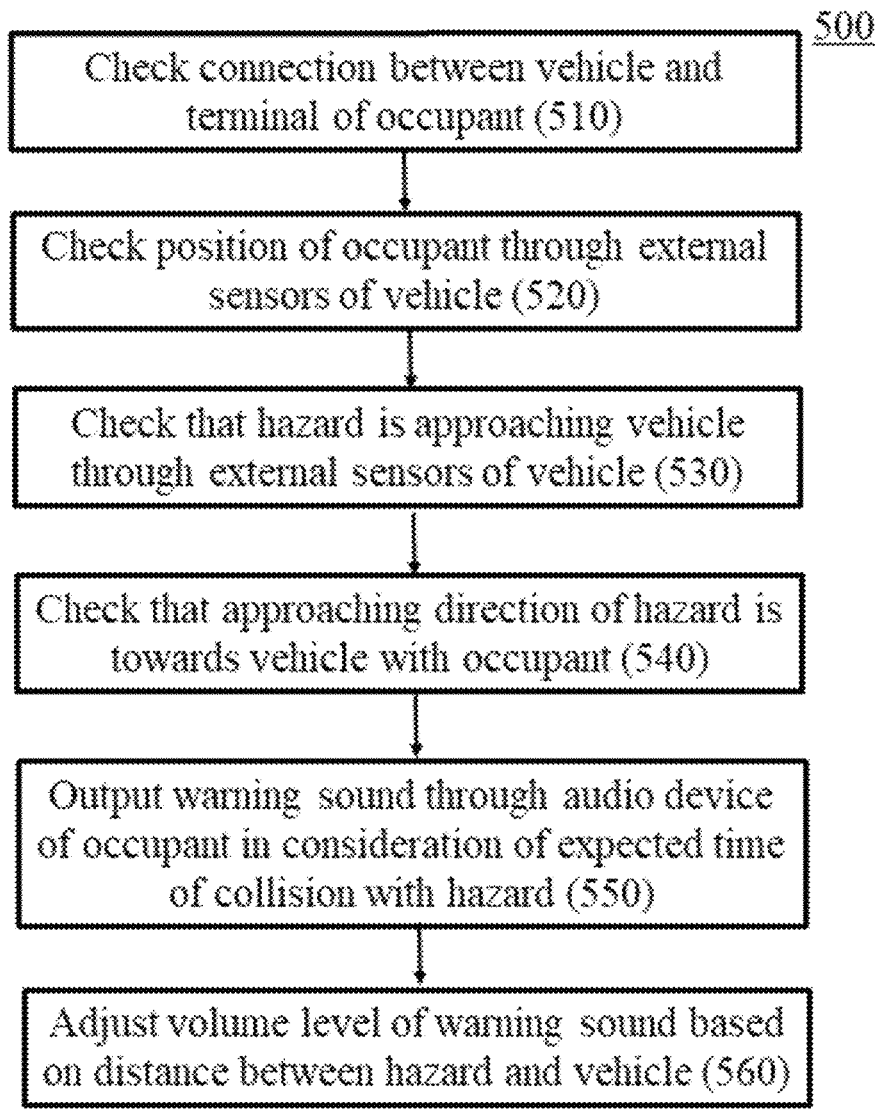
FIG. 5 is a diagram schematically illustrating a process for controlling the sound of an audio device worn by an occupant according to some embodiments of the present disclosure.

FIG. 5 is a diagram schematically illustrating a sequence of controlling the sound of an audio device worn by an occupant according to some embodiments of the present disclosure.

Specifically, to alert the vehicle occupant that a hazard is approaching a vehicle, a warning sound may be transmitted in the following order.

i) It is checked that there is a connection between the vehicle and a terminal of the vehicle occupant (510).

ii) The seating position of the vehicle occupant is checked through sensors of the vehicle (520).

iii) It is checked by the sensors of the vehicle that the hazard is approaching the vehicle (530).

iv) It is checked that the approaching direction of the hazard is towards the vehicle with the occupant (540).

v) The warning sound is transmitted through one side of the audio device placed in the approaching direction of the hazard, considering the expected time of collision between the hazard and the vehicle with the occupant (550).

vi) The volume level of the warning sound is adjusted based on information on the distance between the hazard and the vehicle with the occupant (560).

The present disclosure aims to provide the direction of danger to a vehicle occupant equipped with an audio device in cases where there is a risk of collision between a vehicle and a hazard, which is in the vicinity of the vehicle. The vehicle occupant may perceive the direction and level of danger based on either the right or left side of the audio device where a warning sound is emitted or differences in the volume level of the warning sound emitted from the audio device.

First, the vehicle needs to be connected with the terminal or audio device of the occupant (510).

The occupant in the vehicle may be a vulnerable road user such as a visually impaired individual or elderly person, who has difficulty securing the surroundings visually. Alternatively, the occupant may be a driver wearing an audio device while driving.

The audio device includes all devices such as earphones, headphones, and so on through which the occupant is capable of hearing sound through both ears. The audio device may be connected either wired or wirelessly to the terminal.

The audio device may both input and output sound signals and transmit and receive signals with the terminal. Communication protocols for signal transmission may include the following protocols: Bluetooth, Wi-Fi, wireless universal serial bus (USB), radio frequency identification (RFID), Infrared Data Association (IrDA), near-field communication (NFC), and so on.

The terminal may be a personal computer (PC), a smart device including a smartphone, a personal digital assistant (PDA), or a tablet PC. However, the present disclosure is not limited thereto.

The connection between the vehicle, terminal, or audio device may be paired via Bluetooth.

Once the connection between the vehicle and the terminal of the occupant is confirmed, the position of the vehicle occupant may be checked by a sensing device provided in the vehicle (520). The sensing device may include LiDAR, RADAR, cameras, image sensing devices, object sensing devices, etc. The sensing device may be located outside the vehicle or inside the vehicle.

Once the position of the vehicle occupant is checked, the sensing device may detect whether the hazard is approaching the vehicle (530). The hazard may include pedestrians, bicycles, motorcycles, and vehicles. The hazard may be stationary or in motion.

When the sensing device of the vehicle detects that the hazard is present around the vehicle with the occupant, the sensing device checks whether the hazard is moving towards the vehicle (540). Alternatively, the sensing device checks whether the vehicle is moving towards the hazard. If a collision risk between the hazard and vehicle is determined, a sound control device for audio devices predicts the collision time based on the movement directions and speeds of the hazard and vehicle and provides a warning sound through the audio device worn by the vehicle occupant to alert the danger.

The warning sound may be emitted from either the right or left side of the audio device of the vehicle occupant. The side of the audio device from which the warning sound is emitted may be determined by the direction from which the hazard is approaching the vehicle or the direction in which the vehicle is approaching the hazard (550). In other words, if the hazard is located on the left side of the vehicle, the warning sound may be emitted from the left side of the audio device. If the hazard is on the right side of the vehicle, the warning sound may be emitted from the right side of the audio device.

The volume level of the warning sound emitted from the audio device of the vehicle occupant may vary depending on the distance between the hazard and the vehicle (560). For example, assuming that the distance between the hazard and the vehicle is 5 m and the warning sound is emitted at 10 dB from the audio device of the vehicle occupant, if the distance between the hazard and the vehicle decreases to 3 m, the warning sound may be emitted at 15 dB, and if the distance increases to 4 m, the warning sound may be adjusted to 13 dB. In other words, as the distance between the hazard and the vehicle decreases, the volume level of the warning sound may gradually increase, and as the distance increases, the volume level may gradually decrease.

The vehicle occupant may determine the direction of danger based on the direction in which the warning sound is emitted and also predict the level of danger based on the volume level of the warning sound.

Figure 6:
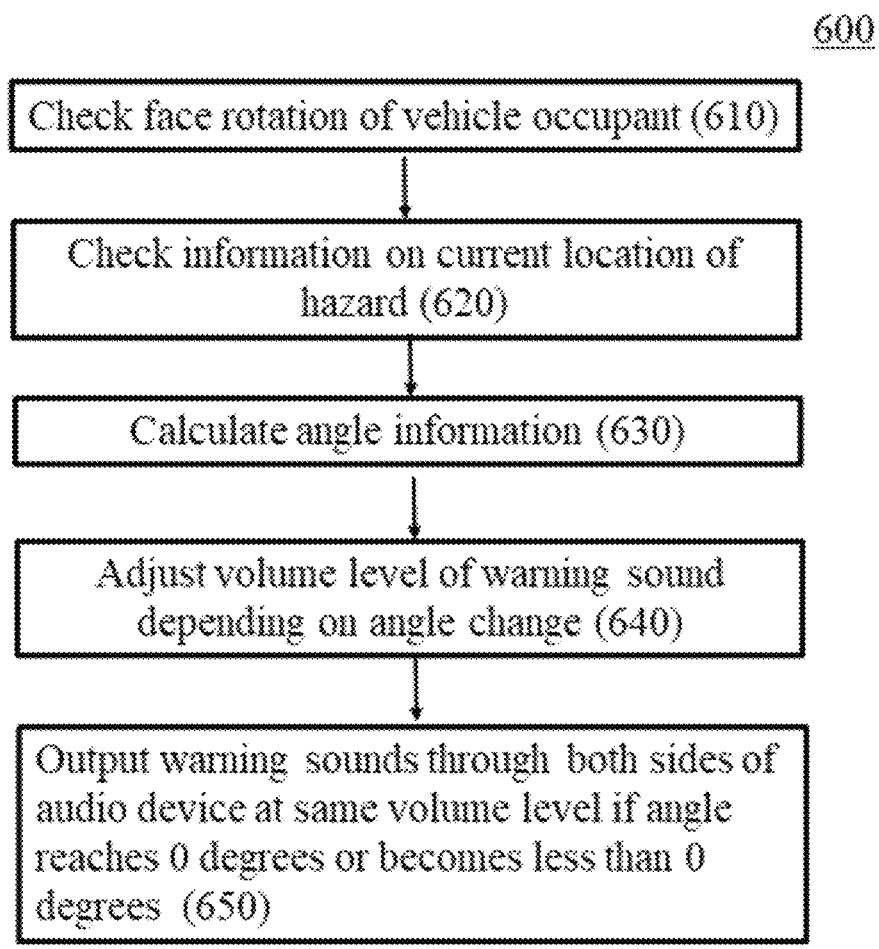
FIG. 6 is a diagram schematically illustrating a sequence of controlling the sound of an audio device when the face of an occupant rotates after emission of a warning sound according to some embodiments of the present disclosure.

FIG. 6 is a diagram schematically illustrating a sequence of controlling the sound of an audio device when the face of an occupant rotates according to some embodiments of the present disclosure.

When a warning sound is emitted from the audio device of the vehicle occupant, the occupant may move the gaze thereof in the direction from which the warning sound comes. Alternatively, the vehicle occupant may move the gaze without perceiving the warning sound or being aware that a hazard is approaching. The gaze movement of the occupant may be checked by a camera installed on a side display. That is, the camera may check the gaze movement of the occupant by detecting the rotation of the face of the occupant. The present disclosure proposes a method for alerting the direction of potential hazards through warning sounds when the face of a vehicle occupant rotates, regardless of whether the vehicle occupant is aware of the hazards.

i) The face rotation of the vehicle occupant is checked (610).

ii) Information on the location of the hazard is obtained from sensors installed in a vehicle (620).

iii) Angle information is calculated based on the hazard, the vehicle occupant, and the gaze direction of the vehicle occupant (630).

iv) Depending on angle changes, the audio device emits warning sounds in the approaching direction of the hazard and the opposite direction and adjusts the volume level thereof (640).

v) When the angle reaches 0 degrees or becomes less than 0 degrees, the audio device emits a warning sound in the opposite direction to the approaching direction of the hazard at the same volume level as when emitting a warning sound in the approaching direction of the hazard (650).

When the hazard approaches the vehicle, a warning sound may be emitted from the audio device worn by the vehicle occupant as described above with reference to FIG. 5. The warning sound may be emitted from one side of the audio device positioned in the approaching direction of the hazard. The vehicle occupant may perceive the warning sound and move the gaze thereof. Alternatively, the vehicle occupant may move the gaze thereof without perceiving the warning sound.

Information on the direction of a gaze movement may be obtained by recognizing the face rotation of the vehicle occupant through equipment installed in the vehicle (for example, a camera on a side display) (610).

The vehicle occupant may move the gaze depending on situations. The occupant may move the gaze towards the approaching direction of the hazard or the opposite direction thereto.

The direction of the gaze movement of the vehicle occupant may be determined by a region of interest (ROI) technique. The ROI technique involves extracting information on a direction in which at least one of multiple regions of interest such as the nose, forehead, and lips is directed from face images of the vehicle occupant captured by imaging devices including the camera installed in the vehicle and considering the extracted direction as the gaze direction of the vehicle occupant. For example, if the nose of the occupant is set as a region of interest in the face image acquired from the camera, the direction towards which the nose of the occupant is pointing may be determined as the gaze direction of the vehicle occupant.

As another example, information on the direction of the gaze movement of the vehicle occupant may be obtained from a sensing device.

In addition, the sensing devices may acquire information on the position of the vehicle occupant as well as the location of the hazard (620).

Information on the angle formed between the hazard, the vehicle occupant, and the gaze direction of the vehicle occupant may be calculated based on information on the position of the vehicle occupant, information on the location of the hazard, and information on the gaze direction of the vehicle occupant (630).

If the vehicle occupant moves the gaze after the warning sound is emitted from the audio device of the vehicle occupant, a warning sound may also be emitted from the other side of the audio device positioned in the opposite direction to the approach direction of the hazard (640).

The volume level of the warning sound emitted from the other side of the audio device placed in the opposite direction may increase as the angle decreases, and the volume level may decrease as the angle increases. The reason why the volume level of the warning sound increases as the angle decreases is that the vehicle occupant is moving the gaze towards the direction from which the hazard is approaching. On the other hand, the reason why the volume level of the warning sound decreases as the angle increases is to inform the vehicle occupant of the direction of danger by increasing the volume level of the warning sound from the approaching direction of the hazard.

When the angle reaches 0 degrees or becomes less than 0 degrees after the gaze of the occupant passes the hazard, it is determined that the occupant perceives the direction of danger. Subsequently, warning sounds are emitted from both left and right sides of the audio device at the same volume level (650). When the angle reaches 0 degrees, it is assumed that the gaze of the vehicle occupant is directed towards the hazard.

Hereinafter, adjusting the volume level of the warning sound emitted from the audio device worn by the vehicle occupant based on the distance and angle will be described in detail with reference to FIGS. 7 to 9.

Figure 7:
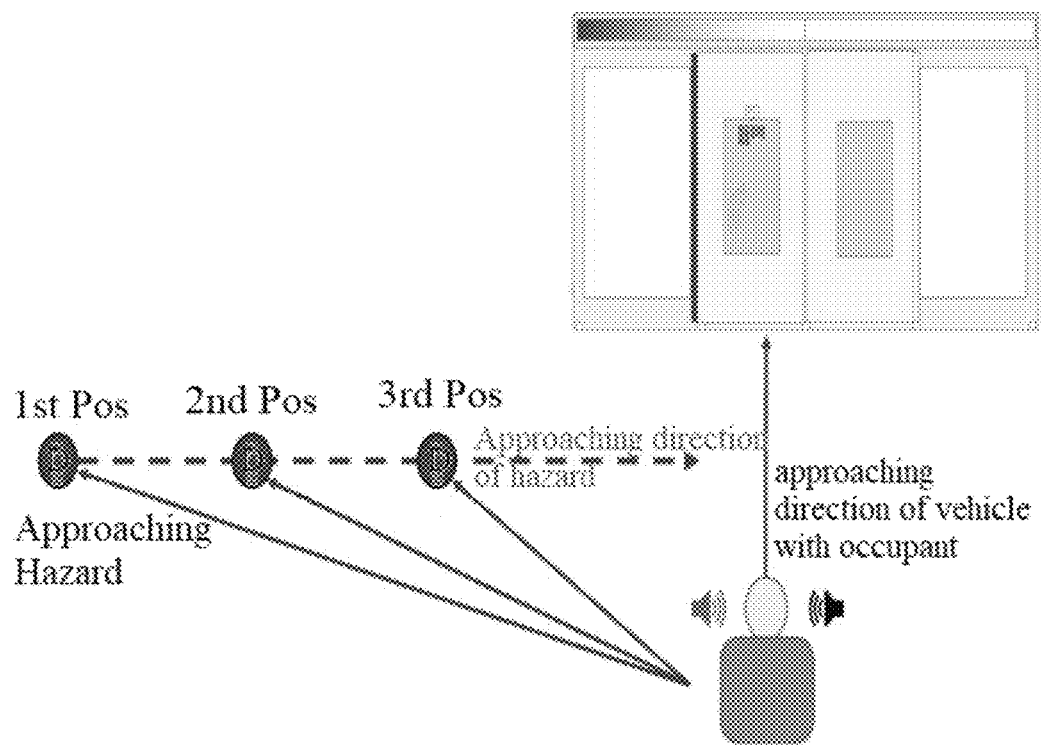
FIG. 7 is a diagram for explaining a method of controlling the sound of one side of an audio device placed in the same direction of a hazard when the hazard is approaching to a vehicle with an occupant.

FIG. 7 is a diagram for explaining a method of controlling the sound of one side of an audio device placed in the same direction of a hazard when the hazard is approaching to a vehicle with an occupant.

Specifically, FIG. 7 shows an example in which a sound control device for audio devices controls a warning sound emitted from one side of the audio device placed in the approaching direction of the hazard when there is a risk of collision due to a decrease in the distance between the hazard and the vehicle with the occupant.

In other words, FIG. 7 is related to controlling the warning sound emitted from the one side of the audio device placed in the approaching direction of the hazard, regardless of the gaze movement of the vehicle occupant.

The risk of collision may occur in the following cases: when the hazard approaches the vehicle with the occupant while the vehicle is stationary; when the hazard approaches the vehicle with the occupant while the vehicle is moving; and when the vehicle with the occupant approaches the hazard while the hazard is stationary.

In this embodiment, the hazard is assumed to be movable transportation such as bicycles or motorcycles.

Referring to FIG. 7, when the vehicle with the occupant is moving in the north direction and the hazard approaches the vehicle with the occupant from the left to the right of the vehicle, if the hazard is positioned at a first position and is at a first distance from the vehicle with the occupant, the sound control device emits a warning sound through the audio device of the occupant. If the hazard is positioned to the left of the vehicle, the warning sound is emitted from the left side of the audio device. If the hazard moves beyond a predetermined distance, the emission of the warning sound is terminated.

Regarding the volume level of the emitted warning sound, the distance between the hazard and the vehicle becomes closer when the hazard is at the second position compared to when the hazard is at the first position. The volume level of the emitted warning sound when the hazard is at the second position may be larger than when the hazard is at the first position. As the hazard approaches position 3, the volume level of the warning sound may increase even more compared to when the hazard is at the first or second position.

As another example, when there is a movement in the gaze of the occupant, the volume level of the warning sound emitted from the one side of the audio device placed in the approaching direction of the hazard increases as the hazard becomes closer to the vehicle. This will be described in detail with reference to FIG. 9.

Figure 8:
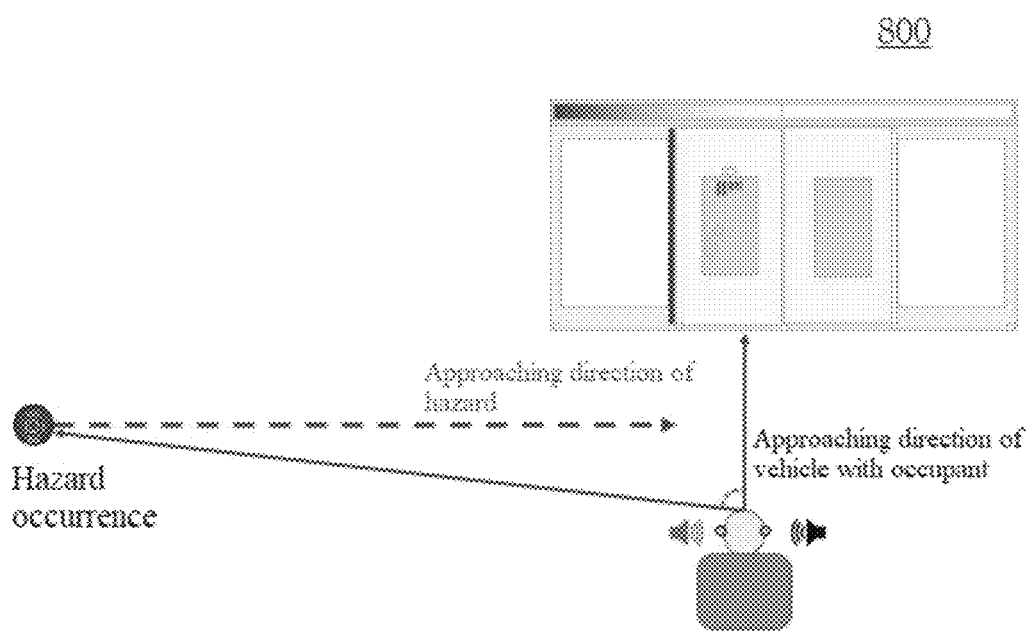
FIG. 8 is a diagram illustrating a method of controlling the sound of one side of an audio device placed in the opposite direction of a hazard when an occupant inside a vehicle moves the gaze thereof after emission of a warning sound according to some embodiments of the present disclosure.

FIG. 8 is a diagram illustrating a method of controlling the sound of one side of an audio device placed in the opposite direction of a hazard when an occupant inside a vehicle moves the gaze thereof according to some embodiments of the present disclosure.

Referring to FIG. 8, when the vehicle with the occupant is moving in the north direction and the hazard approaches the vehicle with the occupant from the left to the right of the vehicle, if the hazard is within a predetermined distance from the vehicle with the occupant, a warning sound is emitted from the left side of the audio device of the occupant. If the occupant moves the gaze to the left, a warning sound is emitted from the right side of the audio device. The warning sound continues to be emitted until the hazard moves a predetermined distance away from the vehicle.

The volume level of the warning sound emitted from the right side of the audio device increases as the angle between the hazard, the vehicle occupant, and the gaze direction of the occupant decreases. A decrease in the angle between the hazard, the vehicle occupant, and the gaze direction of the occupant means that the occupant moves the gaze towards the hazard.

For example, if the angle between the hazard, the vehicle occupant, and the gaze direction of the occupant decreases from 70 degrees to 45 degrees due to the gaze movement of the occupant, the volume level of the warning sound from the right side of the audio device increases. However, the volume level of the warning sound from the right side of the audio device may not exceed the volume level of the warning sound from the left side of the audio device.

Figure 9:
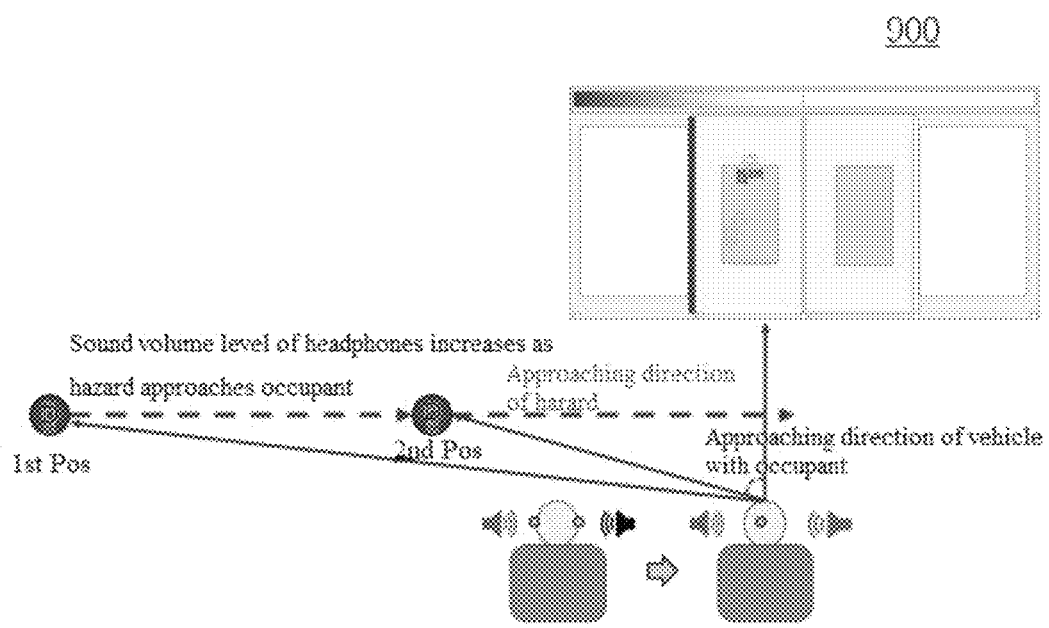
FIG. 9 is a diagram illustrating a method of controlling the sounds of both sides of an audio device when an occupant inside a vehicle moves the gaze thereof after emission of a warning sound according to some embodiments of the present disclosure.

FIG. 9 is a diagram illustrating a method of controlling the sounds of both sides of an audio device when an occupant inside a vehicle moves the gaze thereof according to some embodiments of the present disclosure.

Referring to FIG. 9, when the vehicle with the occupant is moving in the north direction and a hazard approaches the vehicle with the occupant from the left to the right of the vehicle, if the hazard moves from a first position to a second position, the distance between the hazard and the vehicle may change from a first distance to a second distance, and the angle between the hazard, the vehicle, and the gaze direction of the vehicle occupant may also change from a first angle to a second angle.

For example, when the hazard moves from the first position to the second position from the left to the right of the vehicle, a warning sound may be emitted from the left side of the audio device of the vehicle occupant. If there is no gaze movement of the vehicle occupant, no warning sound may be emitted from the right side of the audio device.

In FIG. 9, as the hazard moves from the first position to the second position, the distance decreases from the first distance to the second distance. Therefore, the volume level of the warning sound emitted from the left side of the audio device is greater at the second distance than at the first distance. If the occupant does not move the gaze thereof until the hazard reaches the second position, the warning sound is emitted from only the left side of the audio device, and no warning sounds are be emitted from the right side of the audio device.

As another example, when the hazard moves from the first position to the second position and the occupant moves the gaze thereof, that is, if the vehicle occupant starts to move the gaze to the left while the warning sound is being emitted from the left side of the audio device, a warning sound starts to be emitted from the right side of the audio device as the gaze movement starts. When the hazard moves from the first position to the second position and the vehicle occupant moves the gaze to the left, the first angle becomes smaller than the second angle, and as a result, the volume level of the warning sound from the right side of the audio device gradually increases. However, the volume level of the warning sound from the right side of the audio device may not exceed the volume level of the warning sound from the left side of the audio device. Additionally, the volume level of the warning sound from the left side of the audio device may also gradually increase as the distance changes from the first distance to the second distance, which is shorter than the first distance.

As another example, when the hazard moves from the first position to the second position and the occupant moves the gaze thereof to the right, no warning sounds are emitted from the right side of the audio device. The warning sound is emitted only from the left side of the audio device because it is necessary to alert about the hazard on the left side.

As a further example, when the angle between the hazard, the occupant, and the gaze direction of the occupant reaches 0 degrees, the warning sounds from the left and right sides of the audio devices are emitted at the same volume level. In this case, it is considered that the occupant perceives the hazard. From this moment onwards, it becomes more important to perceive the level of danger based on the distance between the hazard and the vehicle rather than simply being aware of the direction of the hazard.

The above examples are not limited to cases where a hazard moves from left to right. The present disclosure is applicable when a hazard moves from right to left and a vehicle is moving in the south direction. Furthermore, the present disclosure is applicable when a hazard moves in the south or north direction and a vehicle is moving in the east or west direction.

Figure 10:
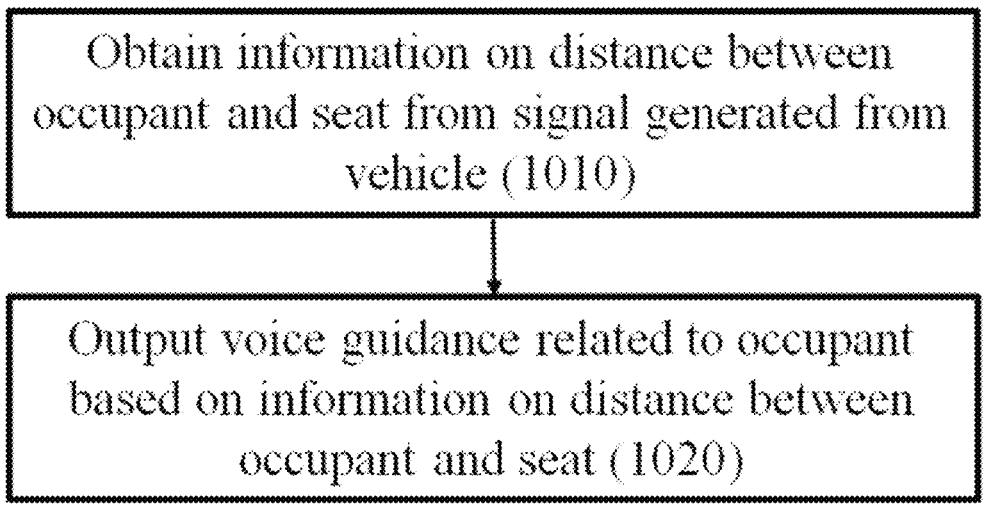
FIG. 10 is a diagram schematically illustrating a method of controlling, by a sound control device for audio devices, the sounds of an audio device worn by an occupant according to some embodiments of the present disclosure.

FIG. 10 is a diagram schematically illustrating a method of controlling, by a sound control device for audio devices, the sounds of an audio device worn by an occupant according to some embodiments of the present disclosure.

The method of controlling, by the sound control device for audio devices, the sounds of the audio device worn by the occupant may include: obtaining information on the occupant and a hazard from sensors provided in a vehicle (1010); and outputting a warning sound through the audio device worn by the occupant to indicate a hazardous situation (1020). A direction in which the audio device outputs the warning sound may be adaptively determined based on the information on the occupant and the hazard.

As described above, the present disclosure has the following effects: i) a warning sound may be emitted from one side of an audio device placed in a specific direction to allow a vehicle occupant to perceive the direction of a hazard; ii) the volume level of the emitted warning sound may be adjusted to allow the vehicle occupant to perceive the risk of collision with the hazard; and iii) a warning sound may be emitted from the other side of the audio device placed in the direction opposite to the direction of the hazard, thereby assessing whether the gaze movement of the vehicle occupant is correct.

The scope of the present disclosure is not limited to the embodiments described above. The scope of the present disclosure includes various modifications and alternatives made by those skilled in the art based on the basic concepts of the present disclosure defined in the following claims.

What is claimed is:

1. A device configured to control sounds of an audio device worn by an occupant, the device comprising:
    an information acquisition unit configured to obtain information on the occupant and a hazard from sensors provided in a vehicle; and
    a controller configured to control the audio device worn by the occupant to output a warning sound to indicate a hazardous situation,
    wherein the controller is configured to adaptively determine a direction in which the audio device outputs the warning sound, based on the information on the occupant and the hazard obtained by the information acquisition unit.

2. The device of claim 1, wherein the information on the occupant and the hazard includes at least one of information on a location of the hazard, information on a gaze direction of the occupant, or information on a distance between the occupant and the hazard.

3. The device of claim 2, wherein the controller determines a sound volume level of the audio device based on the information on the distance between the occupant and the hazard.

4. The device of claim 2, wherein based on a presence of a gaze movement of the occupant, the information acquisition unit further obtains angle information based on the information on the gaze direction of the occupant and the information on the location of the hazard from the sensors.

5. The device of claim 4, wherein the information on the gaze direction of the occupant is obtained by a region of interest (ROI) technique that extracts a direction in which an ROI of the occupant is directed from an image corresponding to a face of the occupant captured by a camera, and
    wherein the ROI includes at least one portion of the face of the occupant.

6. The device of claim 2, wherein based on the information on the gaze direction of the occupant, the controller determines whether the audio device outputs an additional warning sound in a direction opposite to the direction in which the audio device outputs the warning sound.

7. The device of claim 6, wherein the information acquisition unit additionally obtains angle information based on the information on the gaze direction of the occupant and the information on the location of the hazard, and
    wherein the controller determines a sound volume level of the additional warning sound output in the opposite direction, based on the angle information.

8. The device of claim 7, wherein the sound volume level of the additional warning sound output in the opposite direction is inversely proportional to the angle information.

9. A method of controlling, by a sound control device for audio devices, sounds of an audio device worn by an occupant, the method comprising:
    obtaining information on the occupant and a hazard from sensors provided in a vehicle; and
    outputting a warning sound through the audio device worn by the occupant to indicate a hazardous situation,
    wherein a direction in which the audio device outputs the warning sound is adaptively determined based on the information on the occupant and the hazard.

10. The method of claim 9, wherein the information on the occupant and the hazard includes at least one of information on a location of the hazard, information on a gaze direction of the occupant, or information on a distance between the occupant and the hazard.

11. The method of claim 10, wherein a sound volume level of the audio device is determined based on the information on the distance between the occupant and the hazard.

12. The method of claim 10, further comprising: based on a presence of a gaze movement of the occupant, obtaining angle information based on the information on the gaze direction of the occupant and the information on the location of the hazard from the sensors.

13. The method of claim 12, wherein the information on the gaze direction of the occupant is obtained by a region of interest (ROI) technique that extracts a direction in which an ROI of the occupant is directed from an image corresponding to a face of the occupant captured by a camera, and
    wherein the ROI includes at least one portion of the face of the occupant.

14. The method of claim 12, further comprising: based on the information on the gaze direction of the occupant, determining whether the audio device outputs an additional warning sound in a direction opposite to the direction in which the audio device outputs the warning sound.

15. The method of claim 14, further comprising: determining a sound volume level of the additional warning sound output in the opposite direction, based on the angle information.

16. The method of claim 15, wherein the sound volume level of the warning sound output in the opposite direction is inversely proportional to the angle information.

* * * * *